United States Patent [19]

Nishimoto et al.

[11] Patent Number: 5,123,076
[45] Date of Patent: Jun. 16, 1992

[54] WIDE BAND-WIDTH HIGH NA OPTICAL FIBER

[75] Inventors: Hiroaki Nishimoto; Takayuki Mishima, both of Osaka, Japan

[73] Assignee: Sumitomo Electric Industries, Ltd., Osaka, Japan

[21] Appl. No.: 658,876

[22] Filed: Feb. 22, 1991

[30] Foreign Application Priority Data

Feb. 23, 1990 [JP] Japan ............................ 2-43402

[51] Int. Cl.⁵ .............................................. G02B 6/18
[52] U.S. Cl. ..................................... 385/124; 385/145
[58] Field of Search .......................... 350/96.29–96.34; 385/123, 124, 141, 144, 145

[56] References Cited

U.S. PATENT DOCUMENTS 4,167,305  9/1979  Ichiba et al. ................. 350/96.34
4,756,599  7/1988  Maeda et al. ................. 350/96.29
4,946,239  8/1990  Garmon ....................... 350/96.31

FOREIGN PATENT DOCUMENTS 8403776  9/1984  World Int. Prop. O. ....... 350/96.31

*Primary Examiner*—John D. Lee
*Attorney, Agent, or Firm*—Cushman, Darby & Cushman

[57] ABSTRACT

An optical fiber which comprises a core made of a glass material, a thin plastic cladding formed on the peripheral surface of the core and a plastic coating formed on the plastic cladding, and satisfies the conditions (1) a specific refractive index of cladding resin after curing being 0.970 to 0.985 times that of the core periphery at a practical wavelength at ambient temperature, (2) light transmission through the cladding resin after curing being 500 to 4000 dB/km at a practical wavelength, and (3) a coefficient of linear expansion of the cladding resin after curing being not larger than $2.0 \times 10^{-4}/°C.$, which optical fiber has a wide band-width and high NA.

7 Claims, 1 Drawing Sheet

WIDE BAND-WIDTH HIGH NA OPTICAL FIBER

BACKGROUND OF THE INVENTION

1. Field of the Invention

The present invention relates to a wide band-width high NA optical fiber which is used, for example, as an optical transmission line in an intermediate distance high speed optical data link or a computer link.

2. Description of the Related Art

Hitherto, as a technique for enlarging a band-width of a multimode optical fiber, there is known a method for decreasing a mode dispersion by forming a refractive index profile of a core of the optical fiber in the form of a square distribution. A graded index (GI) type quartz core/quartz cladding optical fiber in which an additive such as Ge is used as a dopant to achieve the square distribution type refractive index profile of the core is widely used (see, for example, Gloge and Marcatili, "Multimode Theory of Graded-Core Fibers", The Bell System Technical Journal, 52 (9), 1563–1578 (1973)).

When the GI type quartz optical fiber is designed so as to increase NA (numerical aperture) which is an important structural parameter of the optical fiber for improving an optical coupling efficiency with a light source for optical communication and a bending loss characteristics, a concentration of the dopant such as Ge in the core quartz glass should be increased. Then, in addition to increase of a production cost of the optical fiber due to the use of a rare element such as Ge, a production yield of the optical fiber during drawing of the optical fiber is decreased. Further, it is very difficult to precisely control the dopant concentration to achieve the square distribution of the refractive index profile in comparison with an optical fiber having a low NA. In addition, disturbance of the refractive index profile increases the mode dispersion of transmitted signals so that a band-width of the optical fiber is narrowed.

In contrast, as one measure for designing a high NA quartz optical fiber at a low cost, there is a so-called truncated type optical fiber which has a refractive index gap between a peripheral part of the core and the cladding. In this optical fiber, there is a trade-off relationship between the NA characteristic and the band-width characteristic, and the NA is not increased while the band-width is decreased.

As a technique for providing a high NA optical fiber with a large core diameter and high strength at a low cost, a plastic cladding fiber (PCF) comprising a core made of a glass material and a plastic cladding has been proposed for a long time, and a step index type optical fiber in which a core refractive index is uniform is practically used.

On the increase of band-width by utilizing a so-called mode filter effect of the PCF, some studies have been made (see, for example, Nakahara et al, "Transmission Loss Characteristics of Plastic Cladding Fiber", Optics Quantum Electronics Study Group, Document No. OQE 73-91 (1974) 134). However, the proposed optical fiber increased the band-width with sacrifice of the transmission loss and the NA of the fiber.

Hitherto, design factors which can increase both the NA and the band-width have not been found.

SUMMARY OF THE INVENTION

An object of the present invention is to provide an economical optical fiber having a large effective NA which practically satisfies an increasing requirement for a high NA optical fiber in the optical data link field, suppressing the mode dispersion as low as possible and having good transmission loss characteristics, mechanical strength and environmental resistance.

According to the present invention, there is provided a wide band-width high NA optical fiber which comprises a core made of a glass material having a square distribution type refractive index profile, a thin plastic cladding formed on the peripheral surface of the core and a plastic coating formed on the plastic cladding, and satisfies the following conditions:

(1) a specific refractive index of a cladding resin after curing being 0.970 to 0.985 time that of the core periphery at a practical wavelength at ambient temperature, (2) light transmission through the cladding resin after curing being 500 to 4000 dB/km at a practical wavelength, and (3) a coefficient of linear expansion of the cladding resin after curing being not larger than $2.0 \times 10^{-4}$.

In a preferred embodiment, the optical fiber of the present invention satisfies the following additional conditions:

(4) a refractive index difference in the core (a refractive index difference between the maximum refractive index of a center part of the core and the minimum refractive index of the periphery of the core) being 1.0 to 2.0% at a practical wavelength, (5) a square distribution constant $\alpha$ which represents the core refractive index profile being 1.0 to 2.01, and (6) a cross sectional area of the cladding being not larger than 50% of that of the core.

In a more preferred embodiment, the optical fiber of the present invention satisfies the following conditions:

(4') a refractive index difference in the core being 1.20 to 1.80% at a practical wavelength, (5') a square distribution constant $\alpha$ which represents the core refractive index profile being from 1.83 to 2.01.

DETAILED DESCRIPTION OF THE DRAWINGS

Figure 1:
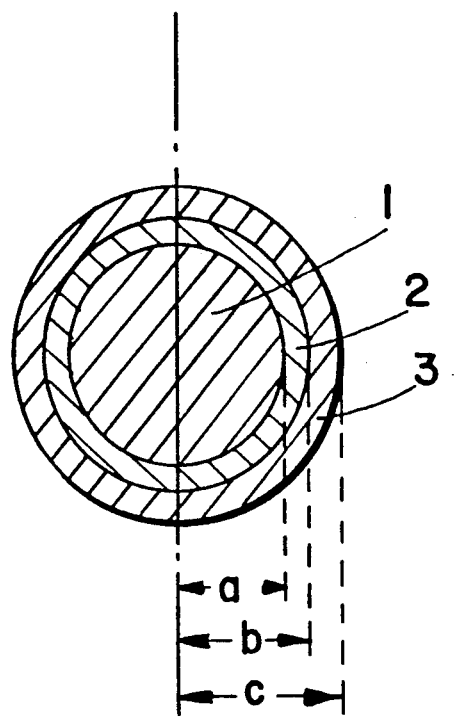
FIG 1 is a cross sectional view of one example of the optical fiber according to the present invention.
Figure 2:
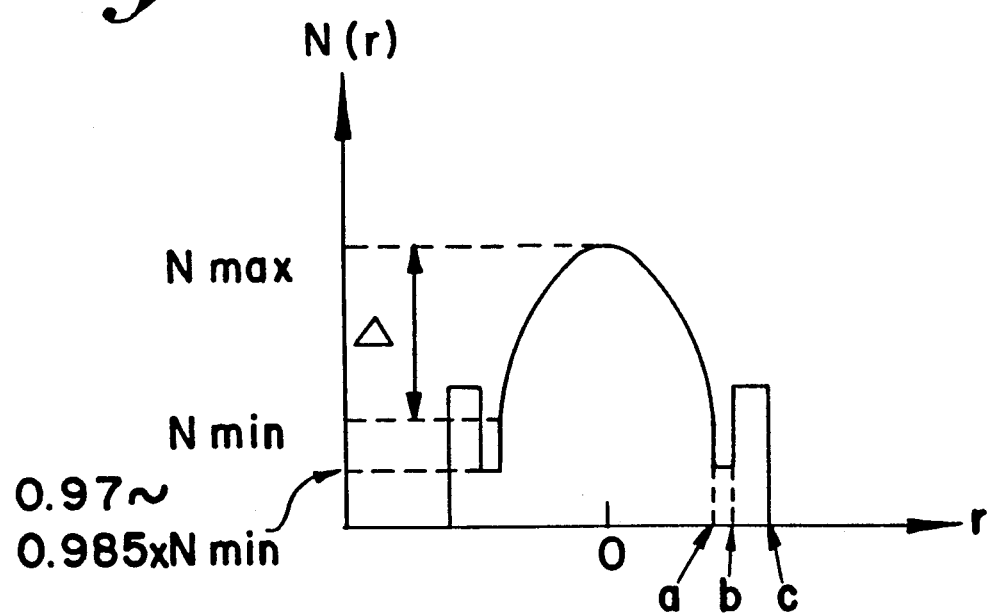
FIG. 2 is a refractive index profile of the optical fiber of FIG. 1.

In FIG. 1, a glass core has a square distribution type refractive index profile, and the refractive index profiles of a glass core 1, a thin plastic cladding 2 and a plastic coating 3 are represented by the following equations:

$$N(r) = N_{max} \times \sqrt{(1 - 2\Delta(r-a)^\alpha)} \quad r \leq a \text{ (core)}$$
$$0.970 \times N_{min.} \leq N(r) \leq 0.985 \times N_{min.} \quad b \geq r > a \text{ (cladding)}$$
$$N(r) > N_{min.} \quad r > b \text{ (coating)}$$

wherein the specific refractive index difference $\Delta$ is $1 - (N_{min.}/N_{max.})$, $2a$ is a diameter of the core, $2b$ is a diameter of the cladding, and $N_{max.}$ and $N_{min.}$ are the maximum and minimum refractive indices in the core, respectively.

The light transmission through the cladding resin after cured at a practical wavelength (for example, from 0.7 to 0.9 μm or from 1.3 to 1.35 μm) is from 500 to 4000 dB/km when measured by a 2 m/1 m cut-back method with a parallel light beam on a resin rod which is produced by curing the cladding resin under the same curing conditions as in the optical fiber drawing.

The specific refractive index difference Δ at the practical wavelength is usually from 1 to 2%, preferably from 1.2 to 1.8%. The square distribution constant α is usually from 1.00 to 2.01, preferably from 1.80 to 2.01.

The coefficient of linear expansion of the cladding resin is not larger than $2.0 \times 10^{-4}$ at ambient temperature.

In addition, b is smaller than $a \times \sqrt{(1.5)}$.

In the present invention, the core is preferably made of doped quartz. As dopant, any conventionally used one such as Ge can be used.

For producing the cladding, a resinous composition comprising (a) a (meth)acrylate monomer or polymer having a fluorine atom in a molecule, (b) a (meth)acrylate monomer or polymer, (c) a coupling agent which forms a chemical bond with the core material and (d) a photopolymerization initiator is preferably used. With such composition, the transmission loss and the transmission band-width are stabilized for a long time, and an easily attachable crimp-style connector can be used.

By changing the number of fluorine atoms in a molecule of the fluorine-containing (meth)acrylate monomer or polymer (a) or a concentration of the monomer or polymer (a) in the resinous composition, a refractive index of the cladding resin can be adjusted as desired.

The addition of the coupling agent can increase adhesion strength between the core and the cladding.

In view of the productivity, it is preferred to formulate a light curing type composition by the addition of the photopolymerization initiator.

Further, in order to easily coat the composition on the core uniformly, a prepolymerized (meth)acrylate having a suitable molecular weight may be added to the composition.

Preferably, the resinous composition contains at least one compound having at least two unsaturated bonds, the coupling agent and the photopolymerization initiator but no compound having only one unsaturated bond other than the photopolymerization initiator. Since a cured material of the composition containing at least one compound having at least two unsaturated bonds has a larger cross linking degree than a cured material of a composition containing a compound having only one saturated bond, the former has better mechanical strength and heat resistance than the latter and a cramping force between the fiber and the connector is not decreased at high temperature so that a protrusion distance of the fiber beyond the connector tip end is small after being kept at high temperature.

In the present invention, the unsaturated bond means a carbon-carbon double bond.

Since the cured material of the above resinous composition becomes brittle when the cross linking degree is increased, the improvement of mechanical strength cannot be achieved effectively through the increase of the cross linking degree. To overcome this defect, a compound having at least one urethane bond can be used as one of the compounds having at least two unsaturated bonds to prevent brittleness of the cured material due to increase of the cross linking degree.

The fluorine-containing (meth)acrylate monomer (a) includes a compound of the formula:

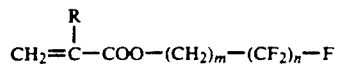

wherein R is a hydrogen atom or a methyl group, m is a number of 1 to 2 and n is a number of 1 to 8; and as the compound having at least two unsaturated bonds, a compound of the formula:

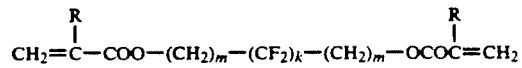

wherein R and m are the same as defined above and k is a number of 2 to 6, a compound of the formula:

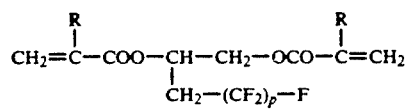

wherein R is the same as defined above and p is a number of 4 to 10, and a compound of the formula:

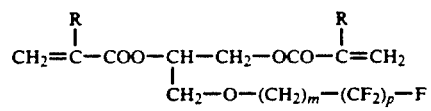

wherein R, m and p are the same as defined above.

A preferred example of the fluorine containing (meth)acrylate polymer (a) is a (meth)acrylate copolymer having a molecular weight of 50,000 to 5,000,000 in terms of a polystyrene molecular weight and unsaturated bonds in side chains which comprises repeating units of the formula:

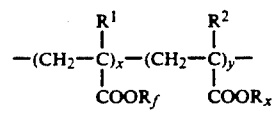

wherein $R^1$ and $R^2$ are independently a hydrogen atom or a methyl group, $R_f$ is a fluoroalkyl group and $R_x$ is a hydrocarbon group having an unsaturated bond.

Examples of $R_x$ are a vinyl group, an allyl group, an acryl group, a methacryl group and an inner olefin group.

A preferred example of $R_f$ is a group of the formula:

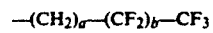

wherein a is 1 or 2 and b is an integer of 2 to 6.

The copolymer may comprise a third component to improve heat resistance. Examples of the third component are isobornyl (meth)acrylate, dicylcopentyl (meth)acrylate, adamantyl (meth)acrylate, etc.

A preferred example of the fluorine-containing (meth)acrylate polymer is a polymer comprising the repeating units of the formula:

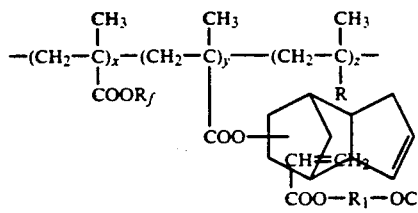

wherein $R_f$ is the same as defined above and R is an alkyl group.

Examples of the (meth)acrylate monomer (b) having at least two unsaturated bonds are 1,4-butanediol (meth)acrylate, ethylene glycol di(meth)acrylate, glycerol dimethacrylate, tetraethylene glycol di(meth)acrylate, diethylene glycol di(meth)acrylate, 1,3-butylene glycol di(meth)acrylate, neopentyl glycol di(meth)acrylate, triethylene glycol (meth)acrylate, triglycerol diacrylate, 1,6-hexanediol di(meth)acrylate, tripropylene glycol diacrylate, trimethylolpropane tri(meth)acrylate, pentaerythritol triacrylate, pentaerythritol tetra(meth)acrylate, ditrimethylolpropane tetraacrylate, dipentaerythritol hexaacrylate, and Kayarad MANDA and R-604 (both trade names of Nippon Kayaku Kabushikikaisha).

Examples of the coupling agent (c) are trimethoxyvinylsilane, methacryloxypropyltrimethoxysilane, dimethylethoxyvinylsilane, etc.

Examples of the compound having at least two unsaturated bonds are diethoxydivinylsilane, dimethoxydivinylsilane, dimethacryloxypropyltrimethoxysilane, etc.

As the photopolymerization initiator (d), a compound which generates a radical when irradiated with UV light is preferably used. Examples of the photopolymerization initiator (d) are benzophenone, acetophenone, benzil, benzoin, benzoin methyl ether, benzoin isobutyl ether, benzyl dimethyl ketal, $\alpha,\alpha'$-azobisisobutyronitrile, benzoyl peroxide, 1-hydroxycyclohexyl phenyl ketone, 2,2-dimethoxy-2-phenylacetophenone, 2-hydroxy-2-methyl-1-phenylpropan-1-one, etc.

Examples of the compound having at least two unsaturated bonds and the urethane bond are polyurethane acrylate of the formula:

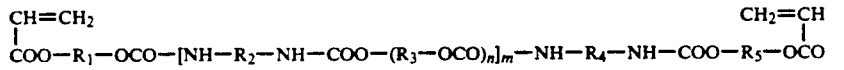

or

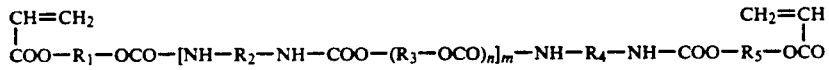

wherein $R_1$, $R_2$, $R_3$, $R_4$ and $R_5$ are independently an alkyl group. These compounds may contain at least one fluorine atom to adjust the refractive index.

The plastic coating is usually made of a fluororesin (e.g. ETFE (ethylene-tetrafluoroethylene copolymer)), a polyamide resin or a polyimide resin.

PREFERRED EMBODIMENTS OF THE INVENTION

The present invention will be illustrated by following Examples.

EXAMPLE 1-6 AND COMPARATIVE EXAMPLES 1-8

By using quartz glass containing Ge dopant in a varying amount as a core material and a photocurable fluorinated acrylate resin composition having different refractive indices or quartz glass as a cladding material, an optical fiber was produced (see Table 1).

With each produced optical fiber, following properties were evaluated:

(i) Transmission loss and transmission band width to LED having a wavelength of 850 mm and light emitting NA of 0.49 (90% FFP), (ii) A coupling efficiency with LED and outgoing NA (90% FFP) at a fiber length of 1 km, (iii) Bending loss characteristics (mandrel diameter: 20 mm, 5 turn winding, measured at a close end of the fiber), and (iv) Pulling off strength between a connector and the optical fiber when a crimp style optical connector is connected to the optical fiber.

The results are shown in Table 2.

TABLE 1

| | | | | | | | Example No. | | | | | | | |
|---|---|---|---|---|---|---|---|---|---|---|---|---|---|---|
| | C. 1 | 1 | 2 | C. 2 | 3 | C. 3 | C. 4 | 4 | 5 | 6 | C. 5 | C. 6 | C. 7 | C. 8 |
| Kind | Square distribution type core PCF | | | | | | | | | | | SI-PCF | GI-AGF | |
| Core diameter ($\mu$m) | 200 | 200 | 200 | 200 | 200 | 200 | 200 | 200 | 200 | 200 | 200 | 200 | 200 | 50 |
| Clad diameter ($\mu$m) | 230 | 230 | 230 | 230 | 230 | 230 | 300 | 230 | 230 | 230 | 230 | 230 | 500 | 125 |
| Core material | Ge-doped quartz | | | | | | | | | | | Quartz | Ge-doped quartz | |
| Cladding material | Fluorinated acrylate resin*1 | | | | | | *2 | *3 | *1 | *1 | *1 | Quartz | | |
| Spec. ref. index of core | | | | | | | | | | | | | | |
| $N_{max.}$ (center) | 1.474 | 1.474 | 1.474 | 1.474 | 1.489 | 1.500 | 1.474 | 1.474 | 1.474 | 1.474 | 1.474 | 1.453 | 1.489 | 1.474 |
| $N_{min.}$ (periphery) | 1.455 | 1.455 | 1.455 | 1.455 | 1.463 | 1.466 | 1.455 | 1.455 | 1.455 | 1.455 | 1.455 | 1.453 | 1.463 | 1.455 |
| Spec. ref. index of cladding | 1.396 | 1.416 | 1.424 | 1.453 | 1.424 | 1.424 | 1.420 | 1.420 | 1.483 | 1.425 | 1.425 | 1.396 | 1.453 | 1.453 |
| Light transmission through | 1240 | 2010 | 1820 | 1890 | 1820 | 1820 | 1690 | 2960 | 1900 | 710 | 470 | 1240 | | |

TABLE 1-continued

| | Example No. | | | | | | | | | | | | | |
|---|---|---|---|---|---|---|---|---|---|---|---|---|---|---|
| | C.1 | 1 | 2 | C.2 | 3 | C.3 | C.4 | 4 | 5 | 6 | C.5 | C.6 | C.7 | C.8 |
| cladding (dB/km) | | | | | | | | | | | | | | |
| Square distribution constant of core | | | | | | 1.83-2.01 | | | | | | ∞ | | 1.83-2.01 |
| Coefficient of linear expansion of cladding (1/°C.) | | | .00009-.00020 | | | | .0003 | .00013 | .00015 | | | .0002 | | ≦7 × 10$^{-7}$ |

TABLE 2

| Example No. | C.1 | 1 | 2 | C.2 | 3 | C.3 | C.4 | 4 | 5 | 6 | C.5 | C.6 | C.7 | C.8 |
|---|---|---|---|---|---|---|---|---|---|---|---|---|---|---|
| Transmission loss (dB/km at 25° C.) | 4.38 | 5.31 | 5.68 | 12.33 | 3.91 | 3.92 | 5.10 | 6.22 | 5.79 | 4.29 | 3.70 | 4.95 | 2.80 | 2.60 |
| Transmission band width (MHz/km) | | | | | | | | | | | | | | |
| at 25° C. | 21 | 71 | 85 | 93 | 58 | 22 | 73 | 89 | 86 | 72 | 29 | 17 | 72 | 68 |
| at 70° C. | 18 | 67 | 81 | 83 | 55 | 21 | 22 | 85 | 83 | | | 14 | 75 | 69 |
| LED coupling efficiency (dB) (relative) | +0.5 | −0.9 | −1.8 | −8.7 | −0.3 | +0.4 | −1.0 | −1.3 | −4.5 | −1.9 | −1.8 | 0 | −3.5 | −7.0 |
| Outgoing NA (/km) | 0.34 | 0.29 | 0.25 | 0.18 | 0.31 | 0.36 | 0.27 | 0.25 | 0.23 | 0.34 | 0.37 | 0.32 | 0.29 | 0.18 |
| Bending loss (dB/10 mmR) (5 turns) | 0.09 | 0.19 | 0.41 | 18.3 | | | | | | | | 0.06 | | |
| | 0.09 | 0.19 | 0.41 | 18.3 | | | | | | | | 0.06 | | |
| Pulling off strength between core and connecter (kg*4) | | | | | | | | | | | | | | |
| at 25°C. | 1.4 | 1.6 | 1.9 | 2.3 | 1.8 | 1.5 | 0.9 | 2.4 | 3.0 | | | 1.5 | | |
| at 80°C. | 0.5 | 0.6 | 0.8 | 0.9 | 0.8 | 0.7 | 0.2 | 1.7 | 2.2 | | | 0.5 | | |

Note:
*1) A mixture of
(1) a compound of the formula:

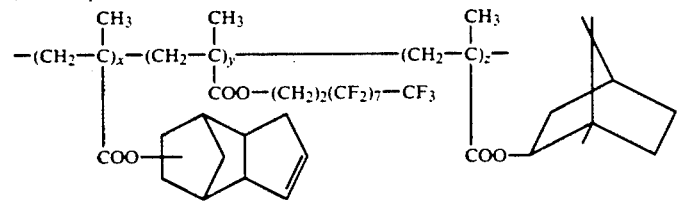

wherein x:y:z = 1:8:1,
(2) $CH_2=CH-COO-(CH_2)_2-(CF_2)_7-CF_3$,
(3) $(CH_2=CH-COOCH_2)_3-C-CH_2CH_3$,
(4) $CH_2=CH-COO-CH_2-C(CH_3)_2-CH_2-OCO-CH=CH_2$,
(5) other additives (a photopolymerization initiator, etc.
in a weight ratio of (1):(2):(3):(4):(5) =
10:70:5:10:5 (Comparative Examples 1 and 6),
10:65:5:15:5 (Example 1),
10:50:15:20:5 (Examples 2 and 3 and Comparative
Examples 3 and 4),
10:30:15:40:5 (Comparative Example 2).
*2) A mixture of
(1) a compound of the formula:

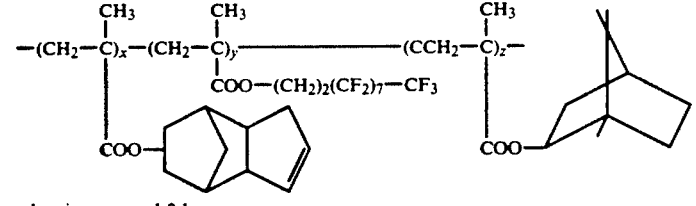

wherein x:y:z = 1:8:1,
(2) $CH_2=CH-COO-(CH_2)_2-(CF_2)_7-(CH_2)_2-OCO-CH=CH_2$,
(3) $(CH_2=CH-COOCH_2)_3-C-CH_2CH_3$,
(4) $CH_2=CH-COO-CH_2-C(CH_3)_2-CH_2-OCO-CH=CH_2$,
(5) other additives (a photopolymerization initiator, etc.)
in a weight ratio of (1):(2):(3):(4):(5) = 10:80:2:3:5.
*3) a mixture of
(1) a compound of the formula:

TABLE 2-continued

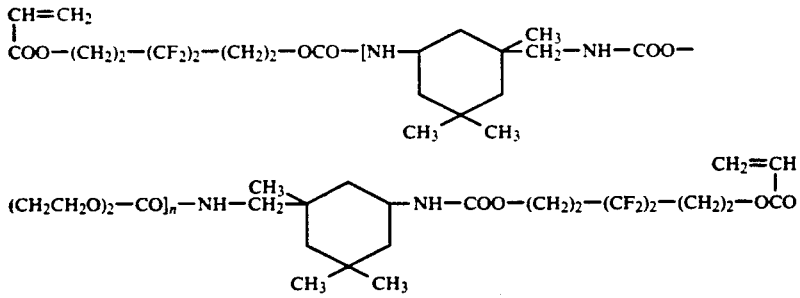

(2) $CH_2=CH-COO-(CH_2)_2-(CF_2)_6-(CH_2)_2-OCO-CH=CH_2$.
(3) $CH_2=CH-COO-(CH_2)_2-(CF_2)_2-(CH_2)_2-COC-CH=CH_2$.
(4) Other additives (a photopolymerization initiator, etc.)
in a weight ratio of (1):(2):(3):(4) = 20:65:10:5.

What is claimed is:

1. A wide band-width high NA optical fiber which comprises a core made of a glass material having a square distribution type refractive index profile, a thin plastic cladding resin formed on the peripheral surface of the core, and a plastic coating formed on the plastic cladding, wherein
   (a) the plastic cladding resin has a specific refractive index after curing of 0.970 to 0.985 times that of the core periphery at a practical wavelength and at ambient temperature;
   (b) light transmission through the cladding resin after curing is 500 to 4000 dB/km at a practical wavelength; and
   (c) the cladding resin has a coefficient of linear expansion, after curing, of not larger than $2.0\times10^{-4}/°C$.; wherein the practical wavelength is selected from wavelengths in the range 700 nm to 900 nm and 1300 nm to 1350 nm.

2. The optical fiber according to claim 1, wherein:
   (d) a refractive index difference in the core, between the maximum refractive index of a center part of the core and the minimum refractive index at the periphery of the core, is 1 to 2% at a practical wavelength;
   (e) a square distribution constant $a$, which represents the core refractive index profile, is 1.0 to 2.01; and
   (f) a cross sectional area of the cladding is not larger than 50% of that of the core.

3. The optical fiber according to claim 2, wherein the refractive index difference in the core is 1.20 to 1.80% at a practical wavelength and wherein the square distribution constant $a$ is from 1.83 to 2.01.

4. The optical fiber according to claim 1, wherein the thin plastic cladding is formed from a resinous composition which contains at least one compound having at least two unsaturated bonds, a coupling agent and a photopolymerization initiator but no compound having only one unsaturated bond other than the photopolymerization initiator.

5. The optical fiber according to claim 4, wherein at least one of the compounds having at least two unsaturated bonds has at least one urethane bond.

6. The optical fiber according to claim 4, wherein the cladding resin comprises the polymerization product of a:
   (a) a (meth)acrylate monomer or polymer which contains fluorine;
   (b) a (meth)acrylate monomer or polymer;
   (c) a coupling agent which forms a bond with the core material.

7. An optical fiber according to claim 6, wherein the cladding resin is formed by photopolymerization using a photopolymerization initiator.

* * * * *